United States Patent
Zhang et al.

(10) Patent No.: US 11,432,253 B2
(45) Date of Patent: Aug. 30, 2022

(54) TECHNIQUES FOR REPORT OF TIMING DIFFERENCE FOR DIFFERENT SYNCHRONIZATION SIGNAL BLOCKS (SSBS) IN A WIRELESS COMMUNICATION SYSTEM

(71) Applicant: QUALCOMM Incorporated, San Diego, CA (US)

(72) Inventors: Qian Zhang, Basking Ridge, NJ (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 17/129,417

(22) Filed: Dec. 21, 2020

(65) Prior Publication Data

US 2021/0235398 A1  Jul. 29, 2021

Related U.S. Application Data

(60) Provisional application No. 62/965,781, filed on Jan. 24, 2020.

(51) Int. Cl.
*H04W 56/00* (2009.01)
*H04W 88/08* (2009.01)
(Continued)

(52) U.S. Cl.
CPC ....... *H04W 56/001* (2013.01); *H04W 56/005* (2013.01); *H04W 72/042* (2013.01);
(Continued)

(58) Field of Classification Search
CPC ............. H04W 56/001; H04W 56/005; H04W 72/042; H04W 72/046; H04W 80/02; H04W 88/085; H04B 7/0695
See application file for complete search history.

(56) References Cited

U.S. PATENT DOCUMENTS

2020/0028768 A1* 1/2020 Sadiq ................... H04B 7/0617

FOREIGN PATENT DOCUMENTS

| WO | 2019022483 A1 | 1/2019 |
| WO | 2019157661 A1 | 8/2019 |
| WO | 2019160266 A1 | 8/2019 |

OTHER PUBLICATIONS

Intel Corporation: "Evaluation Methodology for UE Power Saving Techniques", 3GPP Draft, R1-1812512, 3GPP TSG-RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), XP051554456, 5 Pages, Retrieved from the Internet: URL:http://www.3gpp.org/ftp/Meetings%5F3GPP%5FSYNC/RAN1/Docs/R1%2D1812512%2Ezip [retrieved on Nov. 11, 2018] Section 2. 1.2.

(Continued)

*Primary Examiner* — Kyaw Z Soe
(74) *Attorney, Agent, or Firm* — ArentFox Schiff LLP

(57) ABSTRACT

Aspects described herein relate to report of timing difference for different synchronization signal blocks (SSBs) in fifth generation new radio (5G NR). In an example, the aspects may include receiving, from a network entity, a message indicating at least two SSBs, wherein a first of the two SSBs is associated with a first remote radio header (RRH) and a second of the two SSBs is associated with a second RRH; determining a received timing difference for at least the two SSBs; and transmitting the timing difference for at least the two SSBs to the network entity.

30 Claims, 8 Drawing Sheets

(51) Int. Cl.
*H04W 72/04* (2009.01)
*H04W 80/02* (2009.01)
(52) U.S. Cl.
CPC ......... *H04W 72/046* (2013.01); *H04W 80/02* (2013.01); *H04W 88/085* (2013.01)

(56) References Cited

OTHER PUBLICATIONS

International Search Report and Written Opinion—PCT/US2020/066686—ISA/EPO—dated Apr. 19, 2021.

* cited by examiner

TECHNIQUES FOR REPORT OF TIMING DIFFERENCE FOR DIFFERENT SYNCHRONIZATION SIGNAL BLOCKS (SSBS) IN A WIRELESS COMMUNICATION SYSTEM

CROSS-REFERENCE TO RELATED APPLICATION(S)

This application claims the benefit of U.S. Provisional Application Ser. No. 62/965,781, entitled "TECHNIQUES FOR REPORT OF TIMING DIFFERENCE FOR DIFFERENT SSBS IN A WIRELESS COMMUNICATION SYSTEM" and filed on Jan. 24, 2020, which is expressly incorporated by reference herein in its entirety.

BACKGROUND

Aspects of the present disclosure relate generally to wireless communication systems, and more particularly, to report of timing difference for different synchronization signal blocks (SSBs) in fifth generation new radio (5G NR).

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as NR) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

For example, for various communications technology such as, but not limited to NR, some implementations may increase transmission speed and flexibility but also transmission complexity. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method of wireless communication at a user equipment (UE), including receiving, from a network entity, a message indicating at least two synchronization signal blocks (SSBs), wherein a first of the two SSBs is associated with a first remote radio header (RRH) and a second of the two SSBs is associated with a second RRH. The method may further include determining a received timing difference for at least the two SSBs. The method may further include transmitting the timing difference for at least the two SSBs to the network entity.

A further example implementation includes an apparatus for wireless communications comprising a memory and at least one processor in communication with the memory. The at least one processor may be configured to receive, from a network entity, a message indicating at least two SSBs, wherein a first of the two SSBs is associated with a first RRH and a second of the two SSBs is associated with a second RRH. The at least one processor may further be configured to determine a received timing difference for at least the two SSBs. The at least one processor may be configured to transmit the timing difference for at least the two SSBs to the network entity.

An additional example implementation includes an apparatus for wireless communications. The apparatus may include means for receiving, from a network entity, a message indicating at least two SSBs, wherein a first of the two SSBs is associated with a first RRH and a second of the two SSBs is associated with a second RRH. The apparatus may further include means for determining a received timing difference for at least the two SSBs. The method may further include means for transmitting the timing difference for at least the two SSBs to the network entity.

A further example implementation includes computer-readable medium storing computer code executable by a processor for wireless communications at a network entity comprising code for receiving, from a network entity, a message indicating at least two SSBs, wherein a first of the two SSBs is associated with a first RRH and a second of the two SSBs is associated with a second RRH, determining a received timing difference for at least the two SSBs, and transmitting the timing difference for at least the two SSBs to the network entity.

Another example implementation includes a method of wireless communication at a serving cell having a first RRH and a second RRH, including transmitting, to a UE, a message indicating at least two SSBs, wherein a first of the two SSBs is associated with the first RRH and a second of the two SSBs is associated with the second RRH. The method may further include receiving, from the UE, a determined timing difference for at least the two SSBs representing a difference between received timings of the first of the two SSBs and the second of the two SSBs.

A further example implementation includes an apparatus corresponding to a serving cell having a first RRH and a second RRH for wireless communications comprising a memory and at least one processor in communication with the memory. The at least one processor may be configured to transmit, to a UE, a message indicating at least two SSBs, wherein a first of the two SSBs is associated with the first RRH and a second of the two SSBs is associated with the second RRH. The at least one processor may be configured to receive, from the UE, a determined timing difference for at least the two SSBs representing a difference between received timings of the first of the two SSBs and the second of the two SSBs.

An additional example implementation includes an apparatus corresponding to a serving cell having a first RRH and a second RRH for wireless communications. The apparatus may include means for transmitting, to a UE, a message indicating at least two SSBs, wherein a first of the two SSBs is associated with the first RRH and a second of the two SSBs is associated with the second RRH. The apparatus may further include means for receiving, from the UE, a determined timing difference for at least the two SSBs representing a difference between received timings of the first of the two SSBs and the second of the two SSBs.

A further example implementation includes computer-readable medium storing computer code executable by a processor for wireless communications at a network entity corresponding to a serving cell having a first RRH and a second RRH comprising code for transmitting, to a UE, a message indicating at least two SSBs, wherein a first of the two SSBs is associated with the first RRH and a second of the two SSBs is associated with the second RRH, and receiving, from the UE, a determined timing difference for at least the two SSBs representing a difference between received timings of the first of the two SSBs and the second of the two SSBs.

Another example implementation includes a method of wireless communication at a UE, including receiving, on a downlink communication channel from a first cell, downlink control information (DCI) or a media access control (MAC) control element (CE) indication including inter-cell mobility information, wherein the first cell includes at least one RRH. The method may further include selecting a second cell for communication based at least on the DCI or MAC CE, wherein the second cell includes at least one RRH.

A further example implementation includes an apparatus for wireless communications comprising a memory and at least one processor in communication with the memory. The at least one processor may be configured to receive, on a downlink communication channel from a first cell, DCI or a MAC-CE indication including inter-cell mobility information, wherein the first cell includes at least one RRH. The at least one processor may be configured to select a second cell for communication based at least on the DCI or MAC CE, wherein the second cell includes at least one RRH.

An additional example implementation includes an apparatus for wireless communications. The apparatus may include means for receiving, on a downlink communication channel from a first cell, DCI or a MAC-CE indication including inter-cell mobility information, wherein the first cell includes at least one RRH. The apparatus may further include means for selecting a second cell for communication based at least on the DCI or MAC CE, wherein the second cell includes at least one RRH.

A further example implementation includes computer-readable medium storing computer code executable by a processor for wireless communications at a network entity comprising code for receiving, on a downlink communication channel from a first cell, DCI or a MAC-CE indication including inter-cell mobility information, wherein the first cell includes at least one RRH, and selecting a second cell for communication based at least on the DCI or MAC CE, wherein the second cell includes at least one RRH.

A further example implementation includes a method of wireless communication at a cell, comprising determining one or more RRHs, corresponding SSBs, or corresponding serving cell identifiers to serve the UE. The method may further include transmitting, on a downlink communication channel to the UE, DCI or a MAC-CE indication including inter-cell mobility information, wherein the cell includes at least one RRH.

A further example implementation includes an apparatus for wireless communications comprising a memory and at least one processor in communication with the memory. The at least one processor may be configured to determine one or more RRHs, corresponding SSBs, or corresponding serving cell identifiers to serve the UE. The at least one processor may be configured to transmit, on a downlink communication channel to the UE, DCI or a MAC-CE indication including inter-cell mobility information, wherein the cell includes at least one RRH.

An additional example implementation includes an apparatus for wireless communications. The apparatus may include means for determining one or more RRHs, corresponding SSBs, or corresponding serving cell identifiers to serve the UE. The apparatus may include means for transmitting, on a downlink communication channel to the UE, DCI or a MAC-CE indication including inter-cell mobility information, wherein the cell includes at least one RRH.

A further example implementation includes computer-readable medium storing computer code executable by a processor for wireless communications at a network entity comprising code for determining one or more RRHs, corresponding SSBs, or corresponding serving cell identifiers to serve the UE, and transmitting, on a downlink communication channel to the UE, DCI or a MAC-CE indication including inter-cell mobility information, wherein the cell includes at least one RRH.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
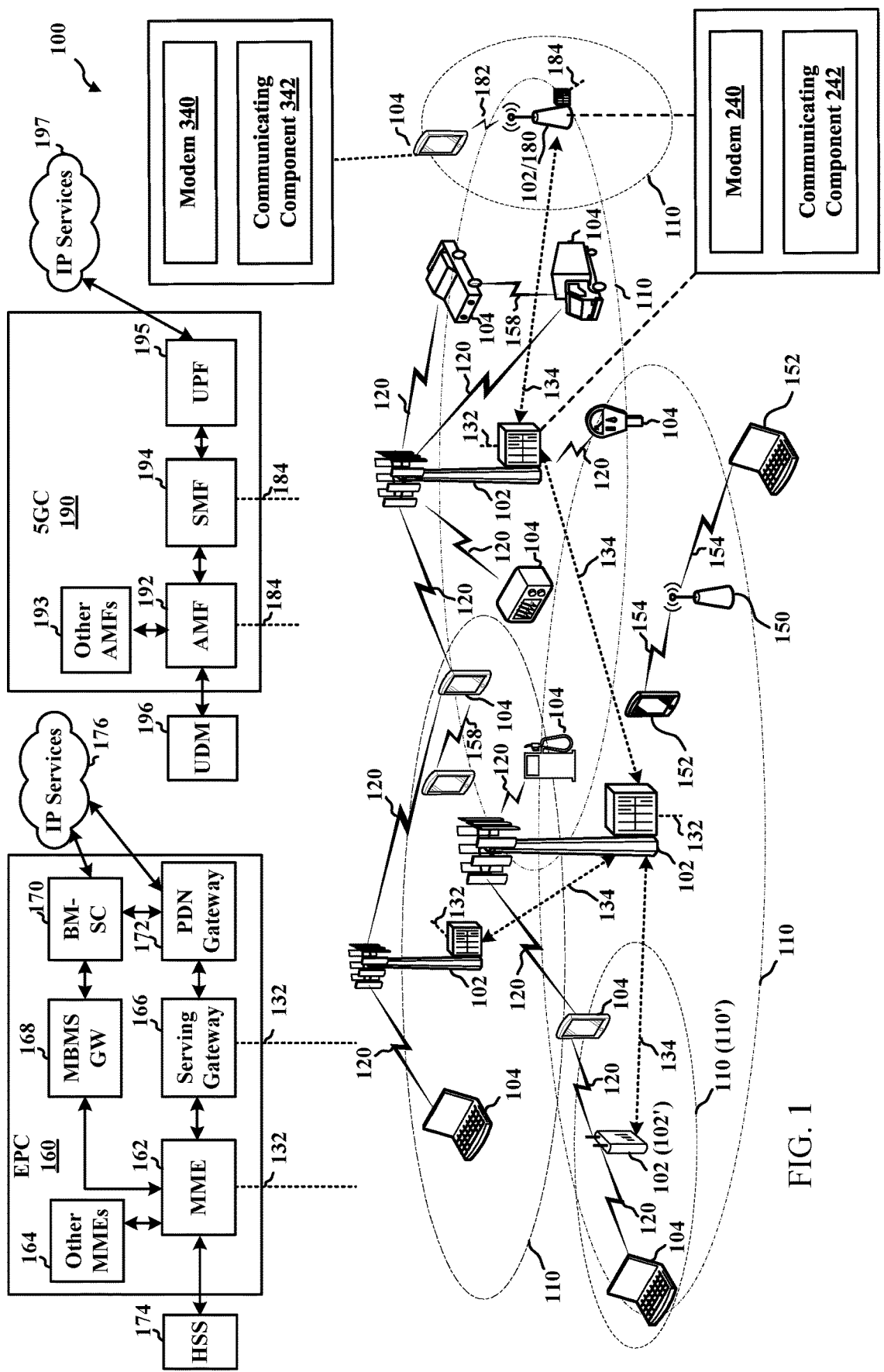
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to reporting of timing difference for different synchronization signal blocks (SSBs) in fifth generation new radio (5G NR). For example, multi-beam operation may be enhanced by targeting frequency range two (FR2) while also being applicable to frequency range one (FR1). In an example, these enhancements may include identifying and specifying features to facilitate more efficient (lower latency and overhead) downlink/uplink (DL/UL) beam management to support higher intra- and Layer 1/Layer 2-centric inter-cell mobility and/or a larger number of configured transmission configuration indicator (TCI) states. This example may include common beam for data and control transmission/reception for DL and UL, especially for intra-band carrier aggregation (CA), unified TCI framework for DL and UL beam indication, and enhancement on signalling mechanisms for the above features to improve latency and efficiency with more usage of dynamic control signalling (as opposed to radio resource control (RRC)). In another example, these enhancements may include identifying and specifying features to facilitate UL beam selection for UEs equipped with multiple panels, considering UL coverage loss mitigation due to maximum permissible exposure (MPE), based on UL beam indication with the unified TCI framework for UL fast panel selection.

In an aspect, the support for multi-TRP deployment may be enhanced by targeting both FR1 and FR2. For example, these enhancements may include identifying and specifying features to improve reliability and robustness for channels other than physical downlink shared channel (PDSCH) (that is, physical downlink control (PDCCH), physical uplink shared channel (PUSCH), and physical uplink control channel (PUCCH)) using multi-transmission reception points (TRP) and/or multi-panel, with Release 16 reliability features as the baseline. These enhancements may further include identifying and specifying quasi-co-location (QCL)/TCI-related enhancements to enable inter-cell multi-TRP operations, assuming multi-downlink control information (DCI) based multi-PDSCH reception. These enhancements may further include evaluating and, if needed, specifying beam-management-related enhancements for simultaneous multi-TRP transmission with multi-panel reception. Additionally, these enhancements may include enhancements to support high speed train (HST)-single frequency network (SFN) deployment scenario. This example may include identifying and specifying solution(s) on QCL assumption for demodulation reference signal (DMRS) (e.g. multiple QCL assumptions for the same DMRS port(s), targeting DL-only transmission), and/or evaluating and, if the benefit over a baseline implementation is demonstrated, specifying QCL/QCL-like relation (including applicable type(s) and the associated requirement) between DL and UL signal by reusing the unified TCI framework.

The present disclosure relates generally to current issues of L1/L2 based mobility with SSB split among remote radio headers (RRH). For example, in an aspect, each serving cell may have multiple RRHs, which share the same SSB identifier (ID) space. Each RRH may transmit a sub-set of SSB IDs but with a same physical cell identity (PCI) for the serving cell. Accordingly, when a UE switches among RRHs within the same serving cell, propagation delay to different RRHs may be different. However, in some communication systems, each serving cell belongs to a single timing advance group (TAG), which has a single TA offset value. Therefore, when the UE switches RRH, a gNB may have to trigger PDCCH order for UL TA measurement and send the updated TA offset to the UE. This may increase RRH switching latency and overhead.

In an aspect, the present disclose includes a method, apparatus, and non-statutory computer readable medium for wireless communications for receiving, from a network entity, a message indicating at least two SSBs, wherein a first of the two SSBs is associated with a first RRH and a second of the two SSBs is associated with a second RRH; determining a received timing difference for at least the two SSBs; and transmitting the timing difference for at least the two SSBs to the network entity.

In another implementation, the present disclosure includes transmitting, to a UE, a message indicating at least two SSBs, wherein a first of the two SSBs is associated with the first RRH and a second of the two SSBs is associated with the second RRH; and receiving, from the UE, a determined timing difference for at least the two SSBs representing a difference between received timings of the first of the two SSBs and the second of the two SSBs.

In another implementation, the present disclosure includes receiving, on a downlink communication channel from a first cell, DCI or a media access control (MAC) control element (CE) indication including inter-cell mobility information, wherein the first cell includes at least one RRH, and selecting a second cell for communication based at least on the DCI or MAC CE, wherein the second cell includes at least one RRH.

The described features will be presented in more detail below with reference to FIGS. 1-7.

As used in this application, the terms "component," "module," "system" and the like are intended to include a computer-related entity, such as but not limited to hardware, software, a combination of hardware and software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) NR networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102, which may also be referred to as network entities, may include macro cells (high power cellular base station) and/or small cells (low power cellular base station). The macro cells can include base stations. The small cells can include femtocells, picocells, and microcells. In an example, the base stations 102 may also include gNBs 180, as described further herein.

In one example, some nodes such as base station 102/gNB 180, may have a modem 240 and communicating component 242 for reporting of timing difference for different SSBs, as described herein. Though a base station 102/gNB 180 is shown as having the modem 240 and communicating component 242, this is one illustrative example, and substantially any node may include a modem 240 and communicating component 242 for providing corresponding functionalities described herein.

In another example, some nodes such as UE 104 of the wireless communication system may have a modem 340 and communicating component 342 for reporting of timing difference for different SSBs, as described herein. Though a UE 104 is shown as having the modem 340 and communicating component 342, this is one illustrative example, and substantially any node or type of node may include a modem 340 and communicating component 342 for providing corresponding functionalities described herein.

In an aspect, some nodes such as UE 104 of the wireless communication system may report the difference of received timings determined based on different SSBs or different subsets of SSBs. For example, the received timing may be actual SSB received timing or frame timing determined by actual SSB received timing. The different SSBs or subsets of SSBs may be transmitted by different RRHs of the same serving cell. Further, some nodes such as base station 102/gNB 180 may configure which two SSBs or two subsets of SSBs to compute the received timing difference, and may configure the UE to report multiple differences for multiple pairs of SSBs or subsets of SSBs. In an example of two subsets of SSBs, the received timing per subset may be computed by averaging the received timing determined by each SSB in that subset. The UE may report the difference of received timings periodically or based on an event trigger. For an event triggered report, the UE is configured to report whenever the difference is different from last reported value. If the UE is switched to beams QCLed with SSB(s) in a SSB subset corresponding to a new RRH, the gNB may signal the received timing difference between new and old SSB subsets (e.g. in same DCI/MAC-CE for beam switching). Based on the timing difference, the UE derives corresponding TA difference for UL transmissions to the new RRH (e.g. if the new frame timing is one symbol later than the old frame timing, the UE shall transmit UL signal 2 symbols earlier). Alternatively, the gNB may directly indicate TA offset for the new RRH, computed based on the reported difference.

In an aspect, each serving cell has one PCI and may have multiple physical cell sites (e.g. RRH). Each RRH may transmit a different set of SSB IDs, but with same PCI for this serving cell. The DCI/MAC-CE may select which RRH(s) or corresponding SSBs to serve the UE based on RSRP per reported SSB ID. In another aspect, each serving cell may be configured with multiple PCIs. Each RRH of the serving cell may use one PCI configured for this serving cell and may transmit the full set of SSB IDs. For example, the DCI/MAC-CE may select which RRH(s) or corresponding PCI(s) and/or SSB(s) to serve the UE based on RSRP per reported SSB ID per reported PCI. In another aspect, each serving cell has one PCI. The DCI/MAC-CE may select which serving cell(s) or corresponding serving cell ID(s) to serve the UE based on RSRP per reported SSB ID per reported PCI.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 132, 134 and/or 184 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a positioning system (e.g., satellite, terrestrial), a multimedia device, a video device, a digital audio player (e.g., MP3 player), a camera, a game console, a tablet, a smart device, robots, drones, an industrial/manufacturing device, a wearable device (e.g., a smart watch, smart clothing, smart glasses, virtual reality goggles, a smart wristband, smart jewelry (e.g., a smart ring, a smart bracelet)), a vehicle/a vehicular device, a meter (e.g., parking meter, electric meter, gas meter, water meter, flow meter), a gas pump, a large or small kitchen appliance, a medical/healthcare device, an implant, a sensor/actuator, a display, or any other similar functioning device. Some of the UEs 104 may be referred to as IoT devices (e.g., meters, pumps, monitors, cameras, industrial/manufacturing devices, appliances, vehicles, robots, drones, etc.). IoT UEs may include MTC/enhanced MTC (eMTC, also referred to as CAT-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Turning now to FIGS. 2-7, aspects are depicted with reference to one or more components and one or more methods that may perform the actions or operations described herein, where aspects in dashed line may be optional. Although the operations described below in FIGS. 4-6B is presented in a particular order and/or as being performed by an example component, it should be understood that the ordering of the actions and the components performing the actions may be varied, depending on the implementation. Moreover, it should be understood that the following actions, functions, and/or described components may be performed by a specially-programmed processor, a processor executing specially-programmed software or computer-readable media, or by any other combination of a hardware component and/or a software component capable of performing the described actions or functions.

Figure 2:
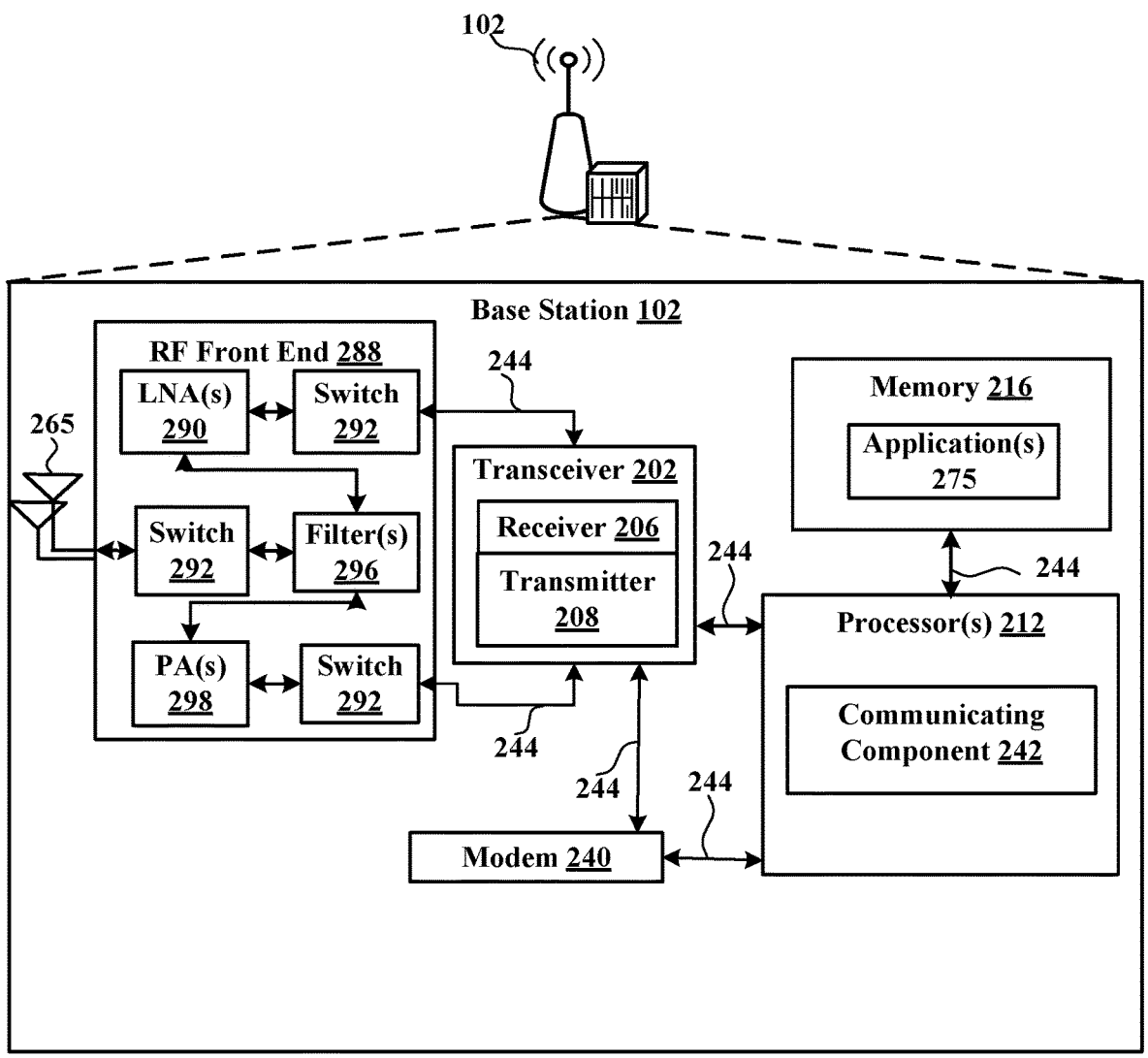
FIG. 2 is a block diagram illustrating an example of a network entity (also referred to as a base station), in accordance with various aspects of the present disclosure.

Referring to FIG. 2, one example of an implementation of a node acting as an IAB node, such as base station 102 (e.g., a base station 102 and/or gNB 180, as described above) may include a variety of components, some of which have already been described above and are described further herein, including components such as one or more processors 212 and memory 216 and transceiver 202 in communication via one or more buses 244, which may operate in conjunction with modem 240 and/or communicating component 242 for beam configurations based on QCL indications.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when base station 102 is operating at least one processor 212 to execute communicating component 242 and/or one or more of its subcomponents.

Transceiver 202 may include at least one receiver 206 and at least one transmitter 208. Receiver 206 may include hardware and/or software executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware and/or software executable by a processor for transmitting data, the code comprising instructions and being stored in a memory (e.g., computer-readable medium). A suitable example of transmitter 208 may including, but is not limited to, an RF transmitter.

Moreover, in an aspect, base station 102 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals. The antennas 265 may include one or more antennas, antenna elements, and/or antenna arrays.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, the processor(s) 212 may correspond to one or more of the processors described in connection with the UE in FIGS. 4 and 6. Similarly, the memory 216 may correspond to the memory described in connection with the UE in FIG. 7.

Figure 3:
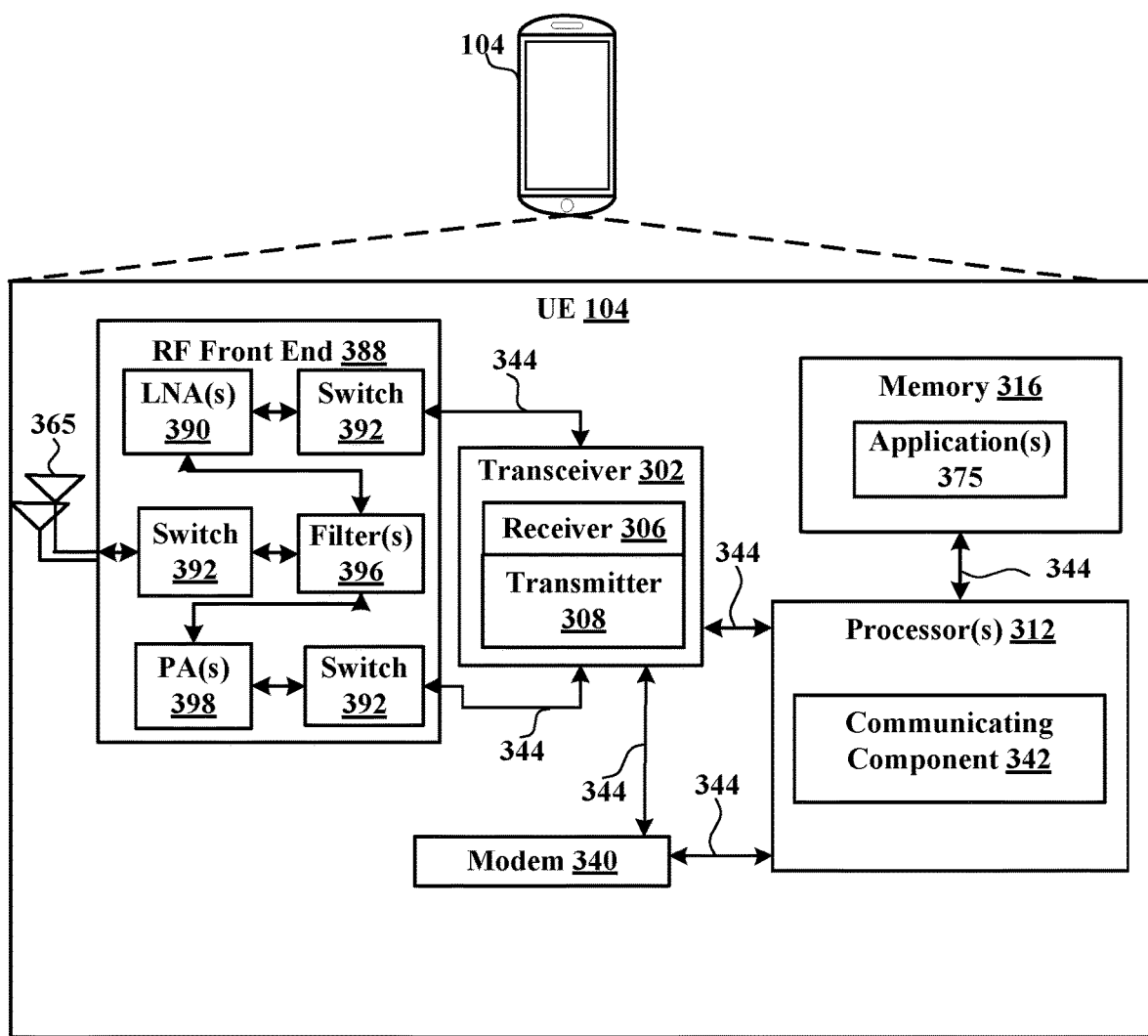
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of base station 102, as described above, but configured or otherwise programmed for base station operations as opposed to base station operations.

In an aspect, the processor(s) 312 may correspond to one or more of the processors described in connection with the base station in FIG. 7. Similarly, the memory 316 may correspond to the memory described in connection with the base station in FIG. 7.

Figure 4:
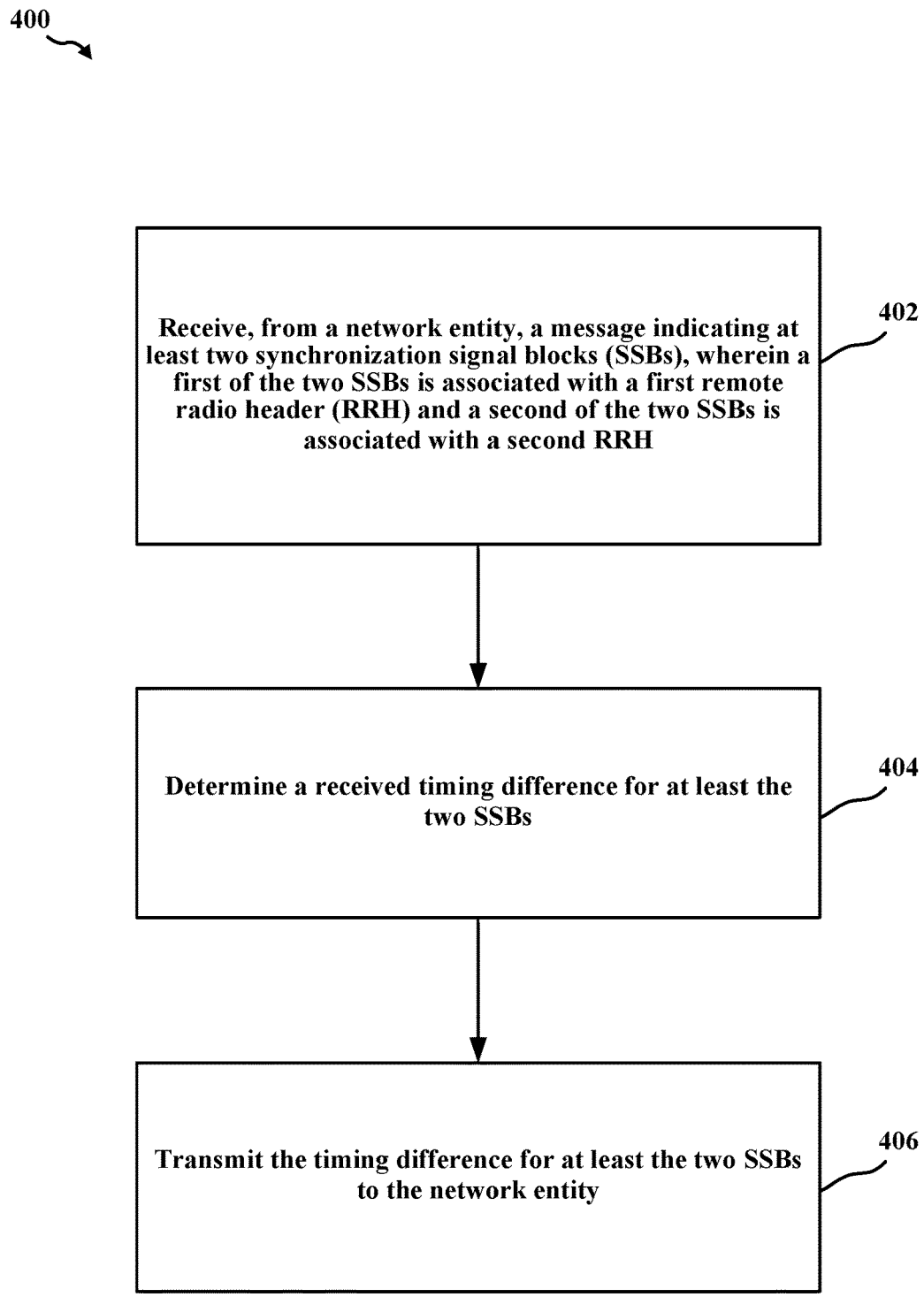
FIG. 4 is a flowchart of a method of wireless communication, and more specifically report of timing difference for different synchronization signal blocks (SSBs) at a UE.

FIG. 4 illustrate a flow chart of an example of a method 400 for wireless communication at a UE. In an example, a UE 104 can perform the functions described in method 400 using one or more of the components described in FIGS. 1, 2, 3, and 7.

At block 402, the method 400 may receive, from a network entity, a message indicating at least two SSBs, wherein a first of the two SSBs is associated with a first RRH and a second of the two SSBs is associated with a second RRH. In an aspect, the communicating component 342, e.g., in conjunction with processor(s) 312, memory 316, and/or transceiver 302, may be configured to receive, from a network entity, a message indicating at least two SSBs, wherein a first of the two SSBs is associated with a first RRH and a second of the two SSBs is associated with a second RRH. In one example, the data can be associated with a priority level. Thus, the UE 104, the processor(s) 312, the communicating component 342 or one of its subcomponents may define the means for receiving, from a network entity, a message indicating at least two SSBs, wherein a first of the two SSBs is associated with a first RRH and a second of the two SSBs is associated with a second RRH.

At block 404, the method 400 may determine a received timing difference for at least the two SSBs. In an aspect, the communicating component 342, e.g., in conjunction with processor(s) 312, memory 316, and/or transceiver 302, may be configured to determine a received timing difference for at least the two SSBs. Thus, the UE 104, the processor(s) 312, the communicating component 342 or one of its subcomponents may define the means for determining a received timing difference for at least the two SSBs.

At block 406, the method 400 may transmit the timing difference for at least the two SSBs to the network entity. In an aspect, the communicating component 342, e.g., in conjunction with processor(s) 312, memory 316, and/or transceiver 302, may be configured to transmit the timing difference for at least the two SSBs to the network entity. Thus, the UE 104, the processor(s) 312, the communicating component 342 or one of its subcomponents may define the means for transmitting the timing difference for at least the two SSBs to the network entity.

In some aspects, determining the received timing difference for at least the two SSBs includes determining a received timing difference for the two SSBs or a frame timing difference based on the received timing difference for the two SSBs.

In some aspects, receiving the message includes receiving the first of the two SSBs from the first RRH of the network entity and the second of the two SSBs from the second RRH of the network entity.

In some aspects, the message further indicates a request to report multiple differences for multiple pairs of SSBs or subset of SSBs including the at least the two SSBs.

In some aspects, receiving the message includes receiving a configuration indication including the at least two SSBs from the multiple pairs SSBs or subset of SSBs to determine the received timing difference.

In some aspects, the two SSBs correspond to a first subset of SSBs and a second subset of SSBs.

In some aspects, determining the received timing difference includes determining a first average of each SSB in the first subset of SSBs and a second average of each SSB in the second subset of SSBs.

In some aspects, the received timing difference is transmitted periodically or based on an event trigger.

In some aspects, method 400 may include determining whether the received timing difference is different from a last timing difference, wherein the received timing difference is transmitted based on determining that the timing difference is different from the last timing difference.

In some aspects, method 400 may include switching from a first set of beams associated with the first RRH to a second set of beams associated with the second RRH, wherein the second set of beams are quasi co-located with the second subset of SSBs, wherein determining the received timing difference includes receiving the timing difference from the network entity in DCI or MAC-CE.

In some aspects, method 400 may include determining a timing difference for uplink transmission to the second RRH based on the received timing difference.

In some aspects, method 400 may include receiving, from the network entity, a timing advance offset associated with the timing difference for uplink transmission to the second RRH.

Figure 5:
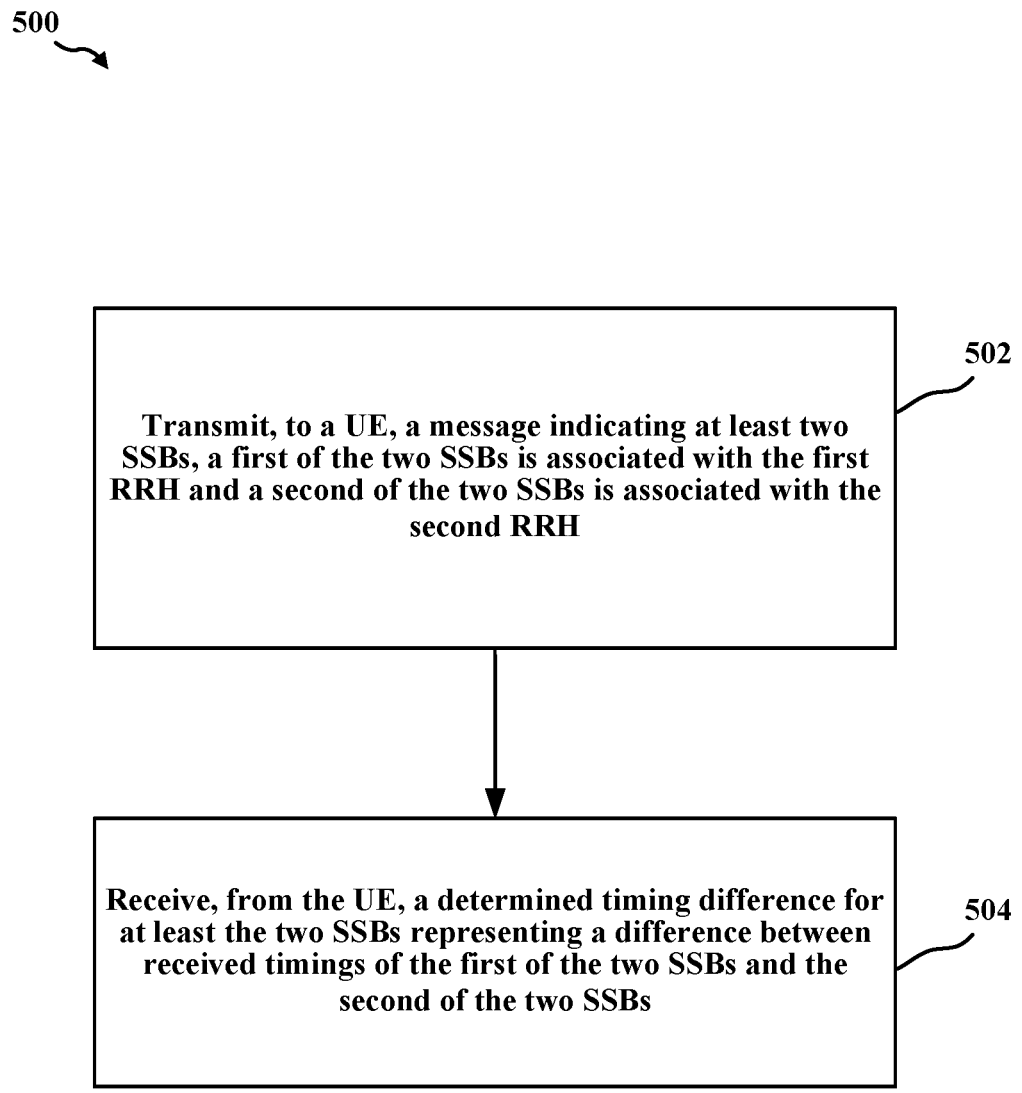
FIG. 5 is a flowchart of another method of wireless communication, and more specifically report of timing difference for different SSBs at a network entity.

FIG. 5 illustrate a flow chart of an example of a method 500 for wireless communication at a network entity such as base station 102. In an example, a base station 102 can perform the functions described in method 500 using one or more of the components described in FIGS. 1, 2, 3, and 7.

At block 502, the method 500 may transmit, to a UE, a message indicating at least two SSBs, wherein a first of the two SSBs is associated with the first RRH and a second of the two SSBs is associated with the second RRH. In an aspect, the communicating component 242, e.g., in conjunction with processor(s) 212, memory 216, and/or transceiver 202, may be configured to transmit, to a UE, a message indicating at least two SSBs, wherein a first of the two SSBs is associated with the first RRH and a second of the two SSBs is associated with the second RRH. In one example, the data can be associated with a priority level. Thus, the base station 102, the processor(s) 212, the communicating component 242 or one of its subcomponents may define the means for transmitting, to a UE, a message indicating at least two SSBs, wherein a first of the two SSBs is associated with the first RRH and a second of the two SSBs is associated with the second RRH.

At block 504, the method 500 may receive, from the UE, a determined timing difference for at least the two SSBs representing a difference between received timings of the first of the two SSBs and the second of the two SSBs. In an aspect, the communicating component 242, e.g., in conjunction with processor(s) 212, memory 216, and/or transceiver 202, may be configured to receive, from the UE, a determined timing difference for at least the two SSBs representing a difference between received timings of the first of the two SSBs and the second of the two SSBs. Thus, the base station 102, the processor(s) 212, the communicating component 242 or one of its subcomponents may define the means for receiving, from the UE, a determined timing difference for at least the two SSBs representing a difference between received timings of the first of the two SSBs and the second of the two SSBs.

In some aspects, transmitting the message includes transmitting the first of the two SSBs from the first RRH of the network entity and the second of the two SSBs from the second RRH of the network entity.

In some aspects, the message further indicates a request to report multiple differences for multiple pairs of SSBs or subset of SSBs including the at least the two SSBs.

In some aspects, transmitting the message includes transmitting a configuration indication including the at least two SSBs from the multiple pairs SSBs or subset of SSBs to obtain the determined timing difference.

In some aspects, the two SSBs correspond to a first subset of SSBs and a second subset of SSBs.

In some aspects, the determined timing difference is received periodically or based on an event trigger.

In some aspects, method 500 may include detecting a switch at the UE from a first set of beams associated with the first RRH to a second set of beams associated with the second RRH, wherein the second set of beams are quasi co-located with the second subset of SSBs; and transmitting a received timing difference DCI or MAC CE.

In some aspects, method 500 may include transmitting, to the UE, a timing advance offset based on the determined timing difference for uplink transmission to the second RRH.

Figure 6A:
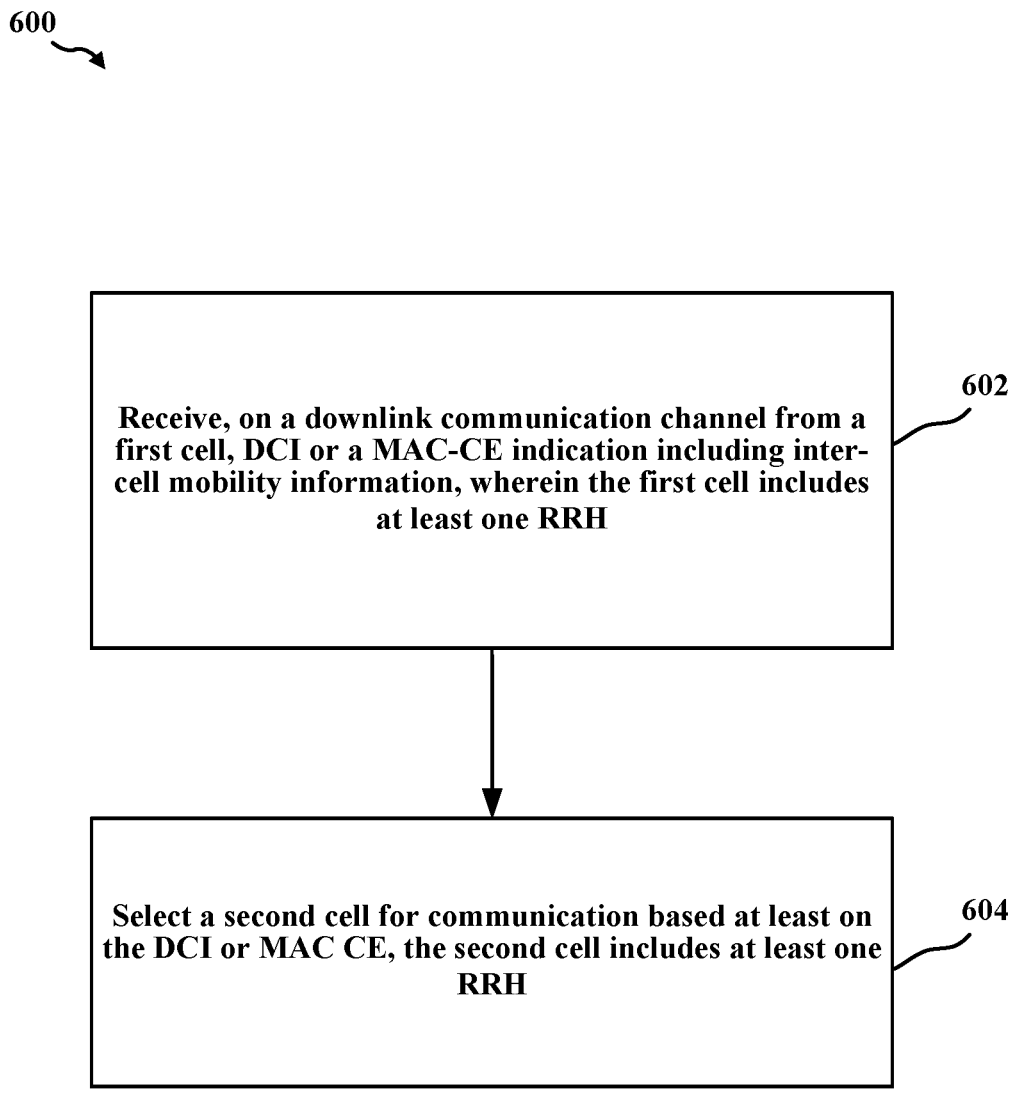
FIG. 6A is a flowchart of another method of wireless communication, and more specifically operation modes of L1/L2-centric inter-cell mobility at a UE.

FIG. 6A illustrate a flow chart of an example of a method 600 for wireless communication at a UE. In an example, a UE 104 can perform the functions described in method 600 using one or more of the components described in FIGS. 1, 2, 3, and 7.

At block 602, the method 600 may receive, on a downlink communication channel from a first cell, DCI or a MAC CE indication including inter-cell mobility information, wherein the first cell includes at least one RRH. In an aspect, the communicating component 342, e.g., in conjunction with processor(s) 312, memory 316, and/or transceiver 302, may be configured to receive, on a downlink communication channel from a first cell, DCI or a MAC CE indication including inter-cell mobility information, wherein the first cell includes at least one RRH. In one example, the data can be associated with a priority level. Thus, the UE 104, the processor(s) 312, the communicating component 342 or one of its subcomponents may define the means for receiving, on a downlink communication channel from a first cell, DCI or a MAC CE indication including inter-cell mobility information, wherein the first cell includes at least one RRH.

At block 604, the method 600 may select a second cell for communication based at least on the DCI or MAC CE, wherein the second cell includes at least one RRH. In an aspect, the communicating component 342, e.g., in conjunction with processor(s) 312, memory 316, and/or transceiver 302, may be configured to select a second cell for communication based at least on the DCI or MAC CE, wherein the second cell includes at least one RRH. In one example, the data can be associated with a priority level. Thus, the UE 104, the processor(s) 312, the communicating component 342 or one of its subcomponents may define the means for selecting a second cell for communication based at least on the DCI or MAC CE, wherein the second cell includes at least one RRH.

In some aspects, the DCI or MAC CE identifies one or more RRHs or corresponding SSBs of at least the second cell for serving the UE.

In some aspects, the DCI or MAC CE identifies one or more RRHs or corresponding physical cell identifiers (PCIs) of at least the second cell for serving the UE.

In some aspects, the DCI or MAC CE defines one or more serving cells each having a distinct cell identifier for serving the UE.

Figure 6B:
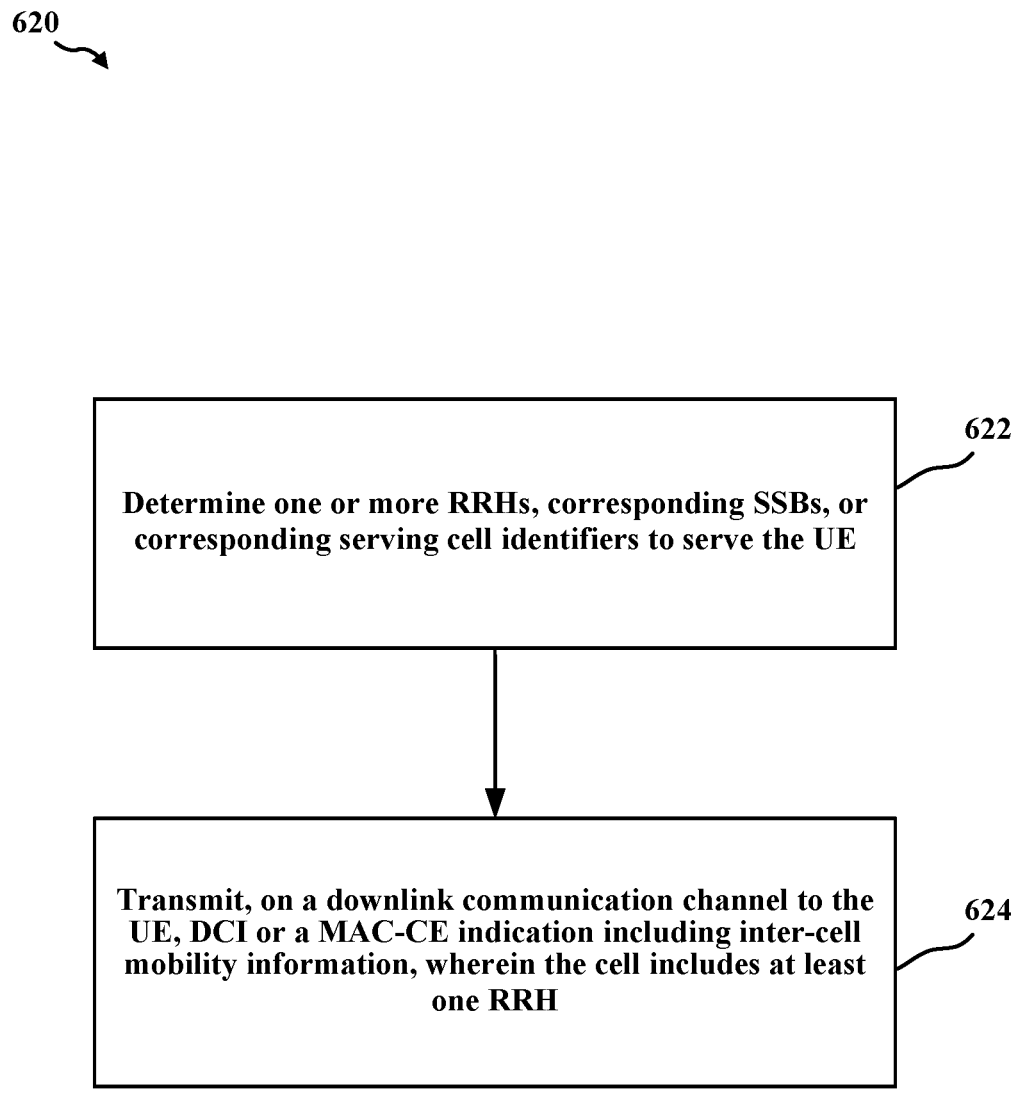
FIG. 6B is a flowchart of another method of wireless communication, and more specifically operation modes of L1/L2-centric inter-cell mobility at a network entity.

FIG. 6B illustrate a flow chart of an example of a method 620 for wireless communication at a network entity such as base station 102. In an example, a base station 102 can perform the functions described in method 500 using one or more of the components described in FIGS. 1, 2, 3, and 7.

At block 622, the method 600 may determine one or more remote radio headers (RRHs), corresponding synchronization signal blocks (SSBs), or corresponding serving cell identifiers to serve the user equipment (UE). In an aspect, the communicating component 242, e.g., in conjunction with processor(s) 212, memory 216, and/or transceiver 202, may be configured to determine one or more remote radio headers (RRHs), corresponding synchronization signal blocks (SSBs), or corresponding serving cell identifiers to serve the user equipment (UE). In one example, the data can be associated with a priority level. Thus, the base station 102, the processor(s) 212, the communicating component 242 or one of its subcomponents may define the means for determining one or more remote radio headers (RRHs), corresponding synchronization signal blocks (SSBs), or corresponding serving cell identifiers to serve the user equipment (UE).

At block 624, the method 600 may transmit, on a downlink communication channel to the UE, downlink control information (DCI) or a media access control (MAC) control element (CE) indication including inter-cell mobility information, wherein the cell includes at least one remote radio header (RRH). In an aspect, the communicating component 242, e.g., in conjunction with processor(s) 212, memory 216, and/or transceiver 202, may be configured to transmit, on a downlink communication channel to the UE, downlink control information (DCI) or a media access control (MAC) control element (CE) indication including inter-cell mobility information, wherein the cell includes at least one remote radio header (RRH). In one example, the data can be associated with a priority level. Thus, the base station 102, the processor(s) 212, the communicating component 242 or one of its subcomponents may define the means for transmitting, on a downlink communication channel to the UE, downlink control information (DCI) or a media access control (MAC) control element (CE) indication including inter-cell mobility information, wherein the cell includes at least one remote radio header (RRH).

Figure 7:
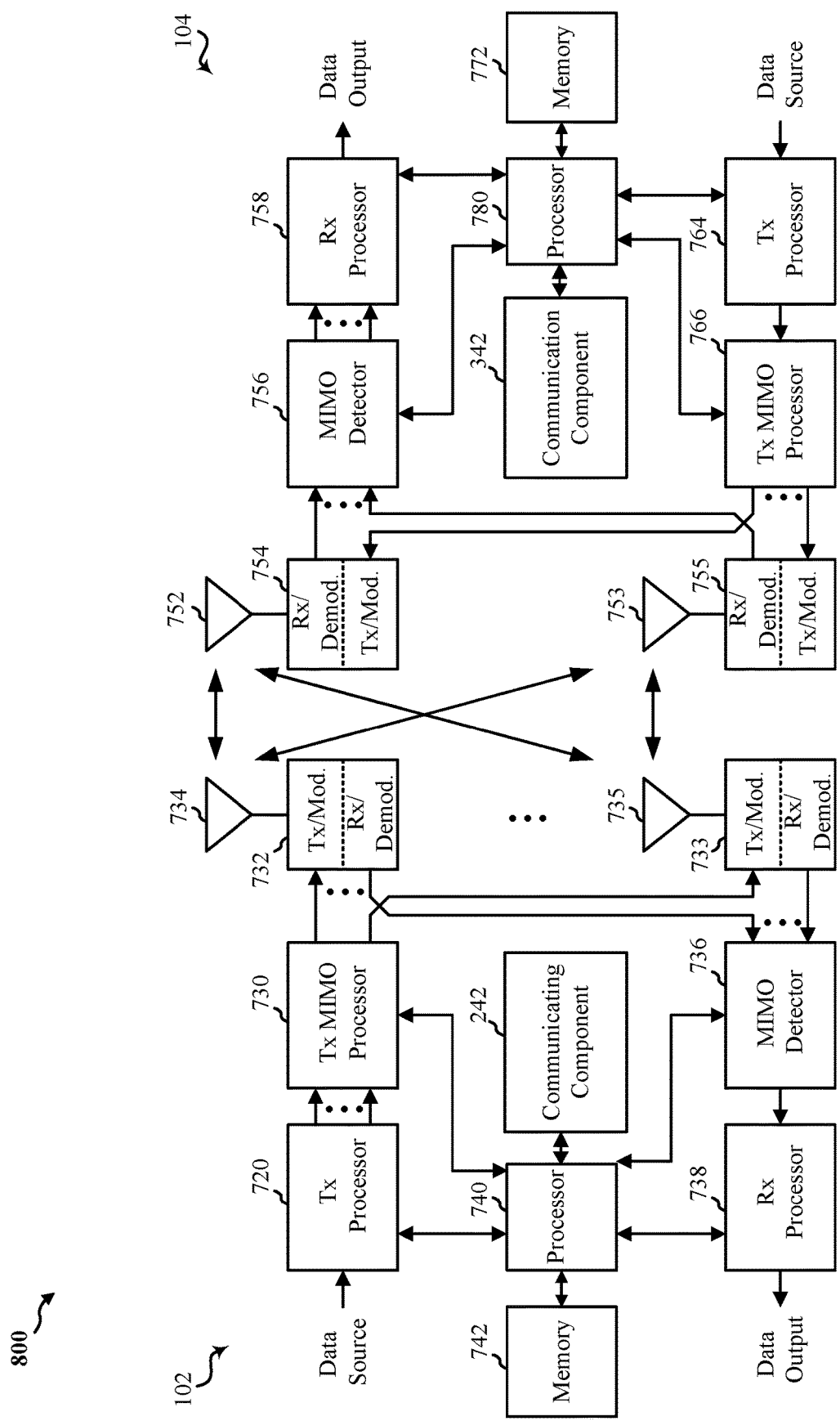
FIG. 7 is a block diagram illustrating an example of a MIMO communication system including a base station and a UE, in accordance with various aspects of the present disclosure.

FIG. 7 is a block diagram of a MIMO communication system 700 including a base station 102, which may be acting as an IAB node or a parent node, and a UE 104. The MIMO communication system 700 may illustrate aspects of the wireless communication access network 100 described with reference to FIG. 1. The base station 102 may be an example of aspects of the base station 102 described with reference to FIG. 1. The base station 102 may be equipped with antennas 734 and 735, and the UE 104 may be equipped with antennas 752 and 753. In the MIMO communication system 700, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 720 may receive data from a data source. The transmit processor 720 may process the data. The transmit processor 720 may also generate control symbols or reference symbols. A transmit MIMO processor 730 may perform spatial processing (e.g., precoding) on data symbols, control symbols, or reference symbols, if applicable, and may provide output symbol streams to the transmit modulator/demodulators 732 and 733. Each modulator/demodulator 732 through 733 may process a respective output symbol stream (e.g., for OFDM, etc.) to obtain an output sample stream. Each modulator/demodulator 732 through 733 may further process (e.g., convert to analog, amplify, filter, and upconvert) the output sample stream to obtain a DL signal. In one example, DL signals from modulator/demodulators 732 and 733 may be transmitted via the antennas 734 and 735, respectively.

The UE 104 may be an example of aspects of the UEs 104 described with reference to FIGS. 1 and 2. At the UE 104, the UE antennas 752 and 753 may receive the DL signals from the base station 102 and may provide the received signals to the modulator/demodulators 754 and 755, respectively. Each modulator/demodulator 754 through 755 may condition (e.g., filter, amplify, downconvert, and digitize) a respective received signal to obtain input samples. Each modulator/demodulator 754 through 755 may further process the input samples (e.g., for OFDM, etc.) to obtain received symbols. A MIMO detector 756 may obtain received symbols from the modulator/demodulators 754 and 755, perform MIMO detection on the received symbols, if applicable, and provide detected symbols. A receive (Rx) processor 758 may process (e.g., demodulate, deinterleave, and decode) the detected symbols, providing decoded data for the UE 104 to a data output, and provide decoded control information to a processor 780, or memory 782.

The processor 780 may in some cases execute stored instructions to instantiate a communicating component 242 (see e.g., FIGS. 1 and 2).

On the uplink (UL), at the UE 104, a transmit processor 764 may receive and process data from a data source. The transmit processor 764 may also generate reference symbols for a reference signal. The symbols from the transmit processor 764 may be precoded by a transmit MIMO processor 766 if applicable, further processed by the modulator/demodulators 754 and 755 (e.g., for SC-FDMA, etc.), and be transmitted to the base station 102 in accordance with the communication parameters received from the base station 102. At the base station 102, the UL signals from the UE 74 may be received by the antennas 734 and 735, processed by the modulator/demodulators 732 and 733, detected by a MIMO detector 736 if applicable, and further processed by a receive processor 738. The receive processor 738 may provide decoded data to a data output and to the processor 740 or memory 742.

The components of the UE 104 may, individually or collectively, be implemented with one or more ASICs adapted to perform some or all of the applicable functions in hardware. Each of the noted modules may be a means for performing one or more functions related to operation of the MIMO communication system 1000. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 700.

SOME ADDITIONAL EXAMPLES

The aspects described herein additionally include one or more of the following implementation examples described in the following numbered clauses.

1. A method of wireless communication at a user equipment (UE), comprising:
receiving, from a network entity, a message indicating at least two synchronization signal blocks (SSBs), wherein a first of the two SSBs is associated with a first remote radio header (RRH) and a second of the two SSBs is associated with a second RRH;
determining a received timing difference for at least the two SSBs; and
transmitting the timing difference for at least the two SSBs to the network entity.

2. The method of clause 1, wherein determining the received timing difference for at least the two SSBs includes determining a received timing difference for the two SSBs or a frame timing difference based on the received timing difference for the two SSBs.

3. The method of any preceding clause, wherein receiving the message includes receiving the first of the two SSBs from the first RRH of the network entity and the second of the two SSBs from the second RRH of the network entity.

4. The method of any preceding clause, wherein the message further indicates a request to report multiple differences for multiple pairs of SSBs or subset of SSBs including the at least the two SSBs.

5. The method of any preceding clause, wherein receiving the message includes receiving a configuration indication including the at least two SSBs from the multiple pairs SSBs or subset of SSBs to determine the received timing difference.

6. The method of any preceding clause, wherein the two SSBs correspond to a first subset of SSBs and a second subset of SSBs.

7. The method of any preceding clause, wherein determining the received timing difference includes determining a first average of each SSB in the first subset of SSBs and a second average of each SSB in the second subset of SSBs.

8. The method of any preceding clause, wherein the received timing difference is transmitted periodically or based on an event trigger.

9. The method of any preceding clause, further comprising determining whether the received timing difference is different from a last timing difference,
wherein the received timing difference is transmitted based on determining that the timing difference is different from the last timing difference.

10. The method of any preceding clause, further comprising switching from a first set of beams associated with the first RRH to a second set of beams associated with the second RRH, wherein the second set of beams are quasi co-located with the second subset of SSBs,
wherein determining the received timing difference includes receiving the timing difference from the network entity in downlink control information (DCI) or media access control (MAC) control element (CE).

11. The method of any preceding clause, further comprising determining a timing difference for uplink transmission to the second RRH based on the received timing difference.

12. The method of any preceding clause, further comprising receiving, from the network entity, a timing advance offset associated with the timing difference for uplink transmission to the second RRH.

13. A method of wireless communication at a serving cell having a first remote radio header (RRH) and a second RRH, comprising:
transmitting, to a user equipment (UE), a message indicating at least two synchronization signal blocks (SSBs), wherein a first of the two SSBs is associated with the first RRH and a second of the two SSBs is associated with the second RRH; and
receiving, from the UE, a determined timing difference for at least the two SSBs representing a difference between received timings of the first of the two SSBs and the second of the two SSBs.

14. The method of clause 13, wherein transmitting the message includes transmitting the first of the two SSBs from the first RRH of the network entity and the second of the two SSBs from the second RRH of the network entity.

15. The method of any preceding clause, wherein the message further indicates a request to report multiple differences for multiple pairs of SSBs or subset of SSBs including the at least the two SSBs.

16. The method of any preceding clause, wherein transmitting the message includes transmitting a configuration indication including the at least two SSBs from the multiple pairs SSBs or subset of SSBs to obtain the determined timing difference.

17. The method of any preceding clause, wherein the two SSBs correspond to a first subset of SSBs and a second subset of SSBs.

18. The method of any preceding clause, wherein the determined timing difference is received periodically or based on an event trigger.

19. The method of any preceding clause, further comprising:
detecting a switch at the UE from a first set of beams associated with the first RRH to a second set of beams associated with the second RRH, wherein the second set of beams are quasi co-located with the second subset of SSBs; and
transmitting a received timing difference downlink control information (DCI) or media access control (MAC) control element (CE).

20. The method of any preceding clause, further comprising transmitting, to the UE, a timing advance offset based on the determined timing difference for uplink transmission to the second RRH.

21. An apparatus for wireless communication, comprising:
a transceiver;
a memory configured to store instructions; and
at least one processor communicatively coupled with the transceiver and the memory, wherein the at least one processor is configured to:
receive, from a network entity, a message indicating at least two synchronization signal blocks (SSBs), wherein a first of the two SSBs is associated with a first remote radio header (RRH) and a second of the two SSBs is associated with a second RRH;

determine a received timing difference for at least the two SSBs; and transmit the timing difference for at least the two SSBs to the network entity.

22. The apparatus of clause 21, wherein to determine the received timing difference for at least the two SSBs, the at least one processor is further configured to determine a received timing difference for the two SSBs or a frame timing difference based on the received timing difference for the two SSBs.

23. The apparatus of any preceding clause, wherein to receive the message, the at least one processor is further configured to receive the first of the two SSBs from the first RRH of the network entity and the second of the two SSBs from the second RRH of the network entity.

24. The apparatus of any preceding clause, wherein the at least one processor is further configured to determine whether the received timing difference is different from a last timing difference, wherein the received timing difference is transmitted based on determining that the timing difference is different from the last timing difference.

25. The apparatus of any preceding clause, wherein the at least one processor is further configured to switch from a first set of beams associated with the first RRH to a second set of beams associated with the second RRH, wherein the second set of beams are quasi co-located with the second subset of SSBs, wherein to determine the received timing difference, the at least one processor is further configured to receive the timing difference from the network entity in downlink control information (DCI) or media access control (MAC) control element (CE).

26. The apparatus of any preceding clause, wherein the at least one processor is further configured to determine a timing difference for uplink transmission to the second RRH based on the received timing difference.

27. The apparatus of any preceding clause, wherein the at least one processor is further configured to receive, from the network entity, a timing advance offset associated with the timing difference for uplink transmission to the second RRH.

28. An apparatus corresponding to at a serving cell having a first remote radio header (RRH) and a second RRH for wireless communication, comprising:

a transceiver;

a memory configured to store instructions; and at least one processor communicatively coupled with the transceiver and the memory, wherein the at least one processor is configured to:

transmit, to a user equipment (UE), a message indicating at least two synchronization signal blocks (SSBs), wherein a first of the two SSBs is associated with the first RRH and a second of the two SSBs is associated with the second RRH; and receive, from the UE, a determined timing difference for at least the two SSBs representing a difference between received timings of the first of the two SSBs and the second of the two SSBs.

29. The apparatus of clause 28, wherein the at least one processor is further configured to:

detect a switch at the UE from a first set of beams associated with the first RRH to a second set of beams associated with the second RRH, wherein the second set of beams are quasi co-located with the second subset of SSBs; and transmit a received timing difference downlink control information (DCI) or media access control (MAC) control element (CE).

30. The apparatus of any preceding clause, wherein the at least one processor is further configured to transmit, to the UE, a timing advance offset based on the determined timing difference for uplink transmission to the second RRH.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, hardwiring, or combinations of any of these. Features implementing functions may also be physically located at various positions, including being distributed such that portions of functions are implemented at different physical locations. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. Also, as used herein, including in the claims, "or"

as used in a list of items prefaced by "at least one of" indicates a disjunctive list such that, for example, a list of "at least one of A, B, or C" means A or B or C or AB or AC or BC or ABC (A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication at a user equipment (UE), comprising:
   receiving, from a network entity, a message indicating at least two synchronization signal blocks (SSBs), wherein a first of the two SSBs is associated with a first remote radio header (RRH) and a second of the two SSBs is associated with a second RRH;
   determining a received timing difference for at least the two SSBs; and
   transmitting the timing difference for at least the two SSBs to the network entity.

2. The method of claim 1, wherein determining the received timing difference for at least the two SSBs includes determining a received timing difference for the two SSBs or a frame timing difference based on the received timing difference for the two SSBs.

3. The method of claim 1, wherein receiving the message includes receiving the first of the two SSBs from the first RRH of the network entity and the second of the two SSBs from the second RRH of the network entity.

4. The method of claim 1, wherein the message further indicates a request to report multiple differences for multiple pairs of SSBs or subset of SSBs including the at least the two SSBs.

5. The method of claim 4, wherein receiving the message includes receiving a configuration indication including the at least two SSBs from the multiple pairs SSBs or subset of SSBs to determine the received timing difference.

6. The method of claim 1, wherein the two SSBs correspond to a first subset of SSBs and a second subset of SSBs.

7. The method of claim 6, wherein determining the received timing difference includes determining a first average of each SSB in the first subset of SSBs and a second average of each SSB in the second subset of SSBs.

8. The method of claim 6, further comprising switching from a first set of beams associated with the first RRH to a second set of beams associated with the second RRH, wherein the second set of beams are quasi co-located with the second subset of SSBs,
   wherein determining the received timing difference includes receiving the timing difference from the network entity in downlink control information (DCI) or media access control (MAC) control element (CE).

9. The method of claim 1, wherein the received timing difference is transmitted periodically or based on an event trigger.

10. The method of claim 1, further comprising determining whether the received timing difference is different from a last timing difference,
    wherein the received timing difference is transmitted based on determining that the timing difference is different from the last timing difference.

11. The method of claim 1, further comprising determining a timing difference for uplink transmission to the second RRH based on the received timing difference.

12. The method of claim 11, further comprising receiving, from the network entity, a timing advance offset associated with the timing difference for uplink transmission to the second RRH.

13. A method of wireless communication at a serving cell having a first remote radio header (RRH) and a second RRH, comprising:
    transmitting, to a user equipment (UE), a message indicating at least two synchronization signal blocks (SSBs), wherein a first of the two SSBs is associated with the first RRH and a second of the two SSBs is associated with the second RRH; and
    receiving, from the UE, a determined timing difference for at least the two SSBs representing a difference between received timings of the first of the two SSBs and the second of the two SSBs.

14. The method of claim 13, wherein transmitting the message includes transmitting the first of the two SSBs from the first RRH and the second of the two SSBs from the second RRH.

15. The method of claim 13, wherein the message further indicates a request to report multiple differences for multiple pairs of SSBs or subset of SSBs including the at least the two SSBs.

16. The method of claim 15, wherein transmitting the message includes transmitting a configuration indication including the at least two SSBs from the multiple pairs SSBs or subset of SSBs to obtain the determined timing difference.

17. The method of claim 13, wherein the two SSBs correspond to a first subset of SSBs and a second subset of SSBs.

18. The method of claim 17, further comprising:
detecting a switch at the UE from a first set of beams associated with the first RRH to a second set of beams associated with the second RRH, wherein the second set of beams are quasi co-located with the second subset of SSBs; and
transmitting a received timing difference downlink control information (DCI) or media access control (MAC) control element (CE).

19. The method of claim 13, wherein the determined timing difference is received periodically or based on an event trigger.

20. The method of claim 13, further comprising transmitting, to the UE, a timing advance offset based on the determined timing difference for uplink transmission to the second RRH.

21. An apparatus for wireless communication, comprising:
a transceiver;
a memory configured to store instructions; and
at least one processor communicatively coupled with the transceiver and the memory, wherein the at least one processor is configured to:
receive, from a network entity, a message indicating at least two synchronization signal blocks (SSBs), wherein a first of the two SSBs is associated with a first remote radio header (RRH) and a second of the two SSBs is associated with a second RRH;
determine a received timing difference for at least the two SSBs; and
transmit the timing difference for at least the two SSBs to the network entity.

22. The apparatus of claim 21, wherein to determine the received timing difference for at least the two SSBs, the at least one processor is further configured to determine a received timing difference for the two SSBs or a frame timing difference based on the received timing difference for the two SSBs.

23. The apparatus of claim 21, wherein to receive the message, the at least one processor is further configured to receive the first of the two SSBs from the first RRH of the network entity and the second of the two SSBs from the second RRH of the network entity.

24. The apparatus of claim 21, wherein the at least one processor is further configured to determine whether the received timing difference is different from a last timing difference, and
wherein the received timing difference is transmitted based on determining that the timing difference is different from the last timing difference.

25. The apparatus of claim 21, wherein the at least one processor is further configured to switch from a first set of beams associated with the first RRH to a second set of beams associated with the second RRH, wherein the second set of beams are quasi co-located with a second subset of SSBs, and
wherein to determine the received timing difference, the at least one processor is further configured to receive the timing difference from the network entity in downlink control information (DCI) or media access control (MAC) control element (CE).

26. The apparatus of claim 21, wherein the at least one processor is further configured to determine a timing difference for uplink transmission to the second RRH based on the received timing difference.

27. The apparatus of claim 26, wherein the at least one processor is further configured to receive, from the network entity, a timing advance offset associated with the timing difference for uplink transmission to the second RRH.

28. An apparatus corresponding to at a serving cell having a first remote radio header (RRH) and a second RRH for wireless communication, comprising:
a transceiver;
a memory configured to store instructions; and
at least one processor communicatively coupled with the transceiver and the memory, wherein the at least one processor is configured to:
transmit, to a user equipment (UE), a message indicating at least two synchronization signal blocks (SSBs), wherein a first of the two SSBs is associated with the first RRH and a second of the two SSBs is associated with the second RRH; and
receive, from the UE, a determined timing difference for at least the two SSBs representing a difference between received timings of the first of the two SSBs and the second of the two SSBs.

29. The apparatus of claim 28, wherein the at least one processor is further configured to:
detect a switch at the UE from a first set of beams associated with the first RRH to a second set of beams associated with the second RRH, wherein the second set of beams are quasi co-located with a second subset of SSBs; and
transmit a received timing difference downlink control information (DCI) or media access control (MAC) control element (CE).

30. The apparatus of claim 28, wherein the at least one processor is further configured to transmit, to the UE, a timing advance offset based on the determined timing difference for uplink transmission to the second RRH.

* * * * *